Jan. 31, 1939.  C. H. NICHOLS  2,145,367
WINDOW OR PANEL FOR MOTOR CARS, MOTOR COACHES, OR THE LIKE
Filed Nov. 16, 1936
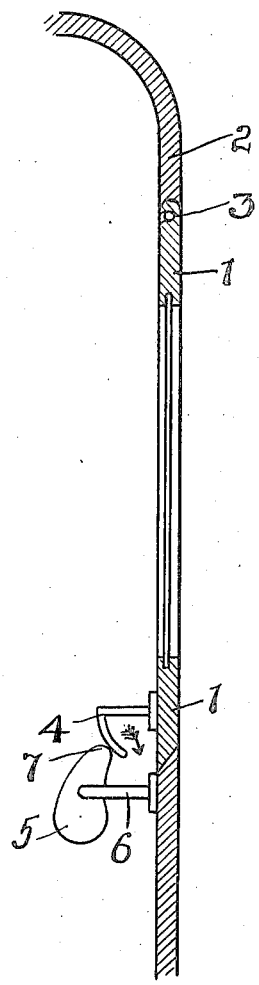
Inventor.
C. H. NICHOLS.
per
Norman S. Barlow
Attorney Patented Jan. 31, 1939

2,145,367

UNITED STATES PATENT OFFICE 2,145,367

WINDOW OR PANEL FOR MOTOR CARS, MOTOR COACHES, OR THE LIKE

Charles Hillyard Nichols, West Bromwich, England, assignor of one-half to Alfred Wickham, West Bromwich, England Application November 16, 1936, Serial No. 111,171
In Great Britain March 30, 1936

1 Claim. (Cl. 296—44)

This invention comprises improvements connected with windows or panels of motor cars, motor coaches or like vehicles and has for its object to provide a window or panel which will automatically become detached from the main body of the car, coach, lorry or like vehicle upon same turning onto its side or top in an accident, thereby minimizing the risk of serious injury from fire, by allowing an exit for escape.

In the drawing a diagrammatic vertical section of a detachable window positioned in a vehicle body is shown.

Referring to the drawing, the window frame 1 is pivotally secured to the car body 2 by means of the hinge 3.

The lower edge of the window frame 1 is preferably provided with a weather tight joint which is preferably of a resilient nature such as rubber.

Mounted on the lower edge of the window frame 1 is one or more brackets 4 which are of a substantially L shape, whilst mounted on the car body 2 adjacent to said bracket or brackets 4 is a pendulum weight or weights 5 which are pivotally mounted in the bracket or brackets 6.

The pendulum weight 5 is adapted to normally hang in the position shown in the drawing so that the end 7 thereof engages the L shaped bracket 4 to retain the window frame 1 in its closed position.

In the event of the vehicle turning onto its left side, the bracket 6 swings from its horizontal position, as shown in the drawing, to a vertical position thereby releasing the bracket 4 which slides over the rounded part 7 of the weight 5 and allow the window to open by swinging about the pivot of the hinge 3.

The pendulum weights 5 controlling each window can be connected together by a bar so that in the event of the pendulum weights 5 sticking from any cause they can be hand operated.

It is obvious that the invention may be equally well applied to panels as well as window frames and that its application on the opposite side of the vehicle body to that shown will be readily understood from the foregoing description so that in the event of the vehicle turning onto its opposite side a detachable window frame or panel would operate in a similar manner to that heretofore described.

I claim:—

Improvements connected with windows or panels of motor cars, motor coaches or the like, comprising in combination, a window or panel pivotally mounted at its top edge, a pendulum weight pivotally mounted in a bracket on the vehicle body and a bracket mounted on the window or panel which is engaged by said pendulum weight to retain the window or panel in position in the vehicle body so that in the event of the vehicle being turned onto its side the bracket on the window or panel swings from its normal position thereby releasing said bracket from the pendulum catch and allows the window or panel to swing on its pivot.

CHARLES HILLYARD NICHOLS.